United States Patent [19]

Freytag et al.

[11] 3,889,271
[45] June 10, 1975

[54] INK JET PROCESS UTILIZING NOVEL DYES

[75] Inventors: Karl-Heinz Freytag; Rudolf Meyer; Klaus Hoffman, all of Leverkusen, Germany

[73] Assignee: Agfa-Gevaert Aktiengesellschaft, Leverkusen-Bayerwerk, Germany

[22] Filed: Nov. 27, 1973

[21] Appl. No.: 419,259

[30] Foreign Application Priority Data

| Dec. 1, 1972 | Germany | 2258836 |
|---|---|---|
| Dec. 1, 1972 | Germany | 2258837 |
| Dec. 1, 1972 | Germany | 2258804 |

[52] U.S. Cl. ............ 346/1; 106/22; 260/175; 260/196; 260/199; 346/75; 346/140
[51] Int. Cl. ... G01d 5/46; G01d 15/16; G01d 15/18
[58] Field of Search ...... 106/22; 260/175, 196, 199; 346/1, 75, 140

[56] References Cited
UNITED STATES PATENTS

| 2,712,006 | 6/1955 | Suckfull et al. | 260/175 |
|---|---|---|---|
| 3,270,349 | 8/1966 | Murphy | 346/140 |
| 3,316,239 | 4/1967 | Riat et al. | 260/196 |
| 3,413,280 | 11/1968 | deMontmollin et al. | 260/196 |
| 3,416,153 | 12/1968 | Hertz et al. | 346/75 |
| 3,435,023 | 3/1969 | Meininger et al. | 260/199 |
| 3,476,874 | 11/1969 | Loughren | 346/75 X |
| 3,488,343 | 1/1970 | deMontmollin et al. | 260/199 |
| 3,494,911 | 2/1970 | deMontmollin et al. | 260/196 |
| 3,562,757 | 2/1971 | Bischoff | 346/1 |
| 3,596,276 | 7/1971 | Lovelady et al. | 346/1 |
| 3,598,594 | 8/1971 | Freytag et al. | 260/175 |
| 3,693,179 | 9/1972 | Skala | 346/1 |
| 3,698,002 | 10/1972 | Appel | 346/1 |

*Primary Examiner*—Morris Liebman
*Assistant Examiner*—T. DeBenedictis, Sr.
*Attorney, Agent, or Firm*—Connolly and Hutz

[57] ABSTRACT

As dyes for inks that are particularly suitable in the ink jet process there are suggested yellow, magenta and cyan dyes particularly described hereinafter. The yellow and magenta dyes are novel azo dyes and the cyan dyes are known copper phthalocyanine dyes having sulfo groups.

2 Claims, No Drawings

INK JET PROCESS UTILIZING NOVEL DYES

This invention relates to the ink jet process and to aqueous yellow, magenta and cyan inks which are particularly suitable for producing colored images by the ink jet process and in particular to new dyes for such inks.

A process has been disclosed in U.S. Pat. No. 3,416,153 in which information in the form of screen or continuous tone images are recorded in one or more colors on a moving support by means of a very fine jet of ink modulated by electric signals. Processes of this kind are known as ink jet processes.

In order to be suitable for use in the ink jet process, the inks and particularly the dyes contained in them must fulfil numerous conditions. The dye must have the required color, at least in the final image. Thus in the case of subtractive color processes it should be as far as possible yellow, magenta or cyan. It should therefore absorb in the desired spectral range and be as free from side absorptions as possible. The dye must adhere firmly to the support and must not run so that the image will be sufficiently sharp. It should also have a high degree of light fastness both in solution and after application. The inks should have a high color intensity. It follows therefore that the dye must be very soluble in water. Lastly, the shape and size of the spray nozzles used for the ink jet process make it necessary that the dye should not significantly increase the viscosity of the ink and moreover it should not crystallize when left to stand.

Colored aqueous inks have now been found which are eminently suitable for use in the ink jet process. These inks are yellow, magenta and cyan colored and thus fit together for making a color reproduction in true colors by the ink jet process. The dyes contained in such inks for providing to them the desired color properties are selected from the following:

a. yellow dyes having the formula

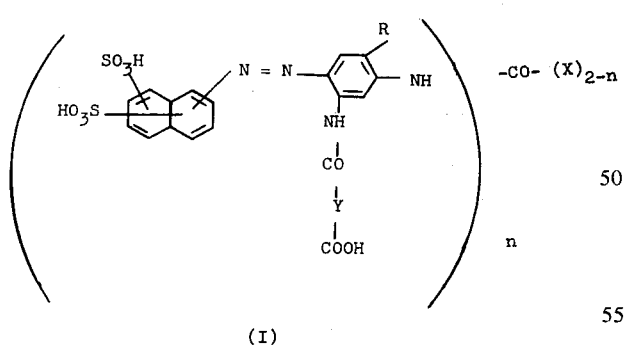

(I)

in which

X represents an alkyl group containing 1 to 4 carbon atoms, e.g. methyl or ethyl, or an alkylamino group containing 1 to 4 carbon atoms, e.g. methylamino or ethylamino, Y represents a divalent saturated or unsaturated aliphatic group which may be interrupted by an oxygen atom, preferably an alkylene group containing 1 to 4 carbon atoms, an alkylene group containing 2 to 4 carbon atoms or a group of the formula $-(CH_2)_p-O-(CH_2)_p-$ in which $p$ is an integer of from 1 to 4

R represents a hydrogen atom, an alkyl group containing 1 to 4 carbon atoms such as methyl, or an alkoxy group containing 1 to 4 carbon atoms such as methoxy, and $n = 1$ or 2.

b. magenta dyes having the formula

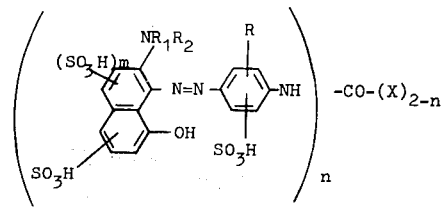

in which

X represents an alkyl group with 1 – 4 carbon atoms, e.g. methyl or ethyl, or an alkylamino group containing 1 – 4 carbon atoms, e.g. methylamino or ethylamino, $R_1$ represents hydrogen or an alkyl group containing 1 – 4 carbon atoms, $R_2$ represents hydrogen or an alkyl group containing 1 – 4 carbon atoms, which may be substituted, e.g. a hydroxyalkyl, cyanoalkyl, carboxyalkyl or sulfoalkyl group, R represents hydrogen or an alkyl or alkoxy group containing 1 – 4 carbon atoms, for example methyl or methoxy, $n = 1$ or 2 and $m = 0$ or 1.

c. cyan dyes - copper phthalocyanines having on an average 1 to 4, preferably 2 to 3 sulfo groups per molecule of copper phthalocyanine. The content of sulfo groups is given as an average since in most cases the sulfo groups are introduced into the phthalocyanine and there is obtained a mixture of phthalocyanines having more or less sulfo groups. In the following there are given some examples of useful yellow, magenta and cyan dyes that are contained in the inks of the invention.

Dye:
  yellow:
1.
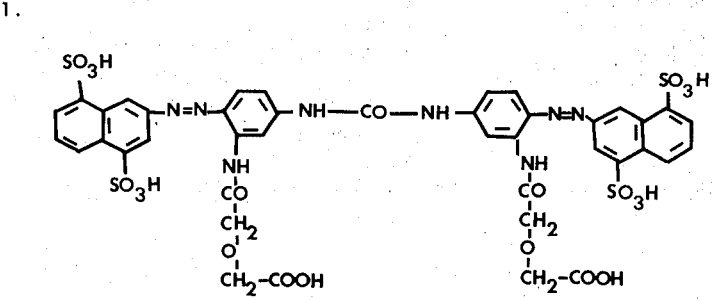
2.
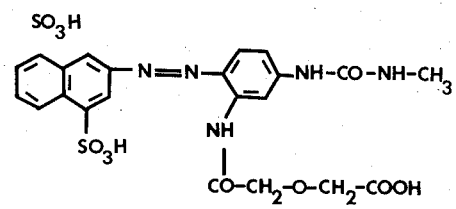
3.
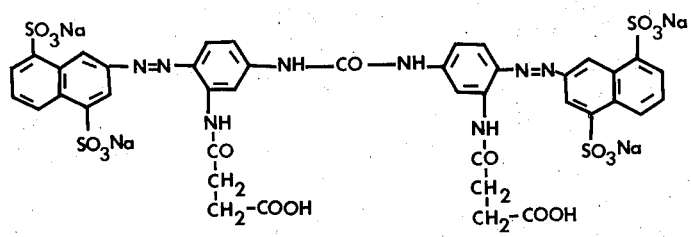
4)
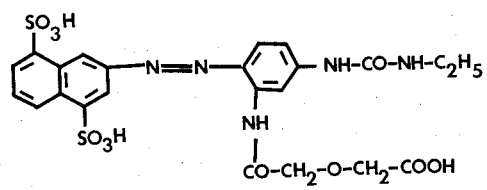
5)
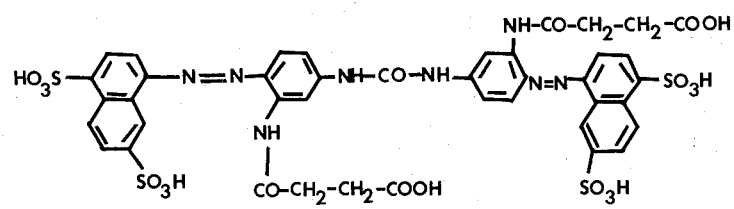
6)
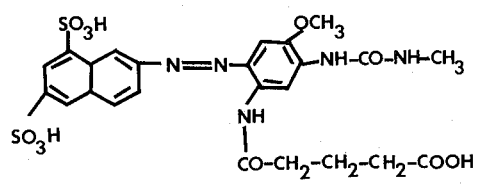
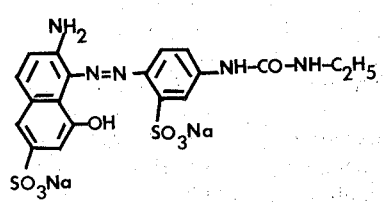

7) 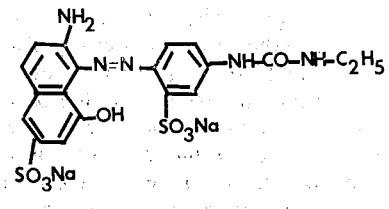

8) 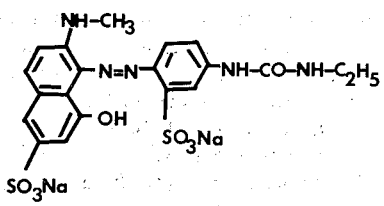

9) 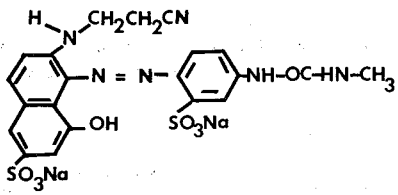

10) 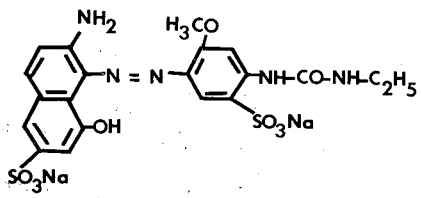

11) 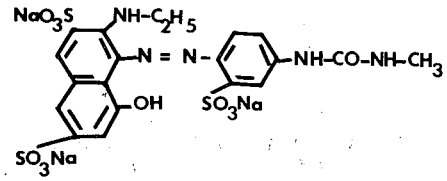

12) 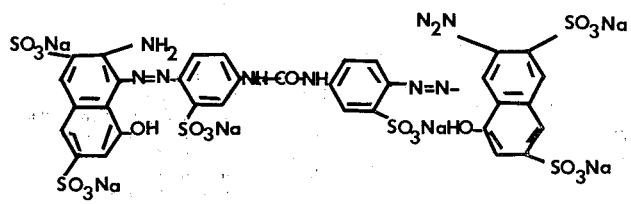

13) 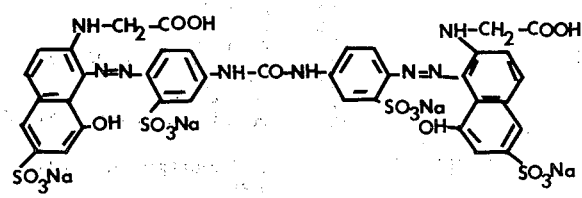

14. cyan: Sirius Light turquoise blue GL (C.I. 74 180)

The yellow and magenta dyes are new and are prepared by methods known in the chemistry of azo dyes. For producing the yellow dyes it is convenient to start with diazotized aminonaphthalene-di- or -tri-sulfonic acids which ar coupled with 1-aminobenzene-3-dicarboxylic acid amides and then reacted either with phosgene to produce a symmetrical urea or with an aliphatic isocyanate to form an asymmetric urea.

Similarly the magenta dyes may be prepared from diazotized p-nitroanilinosulfonic acids which are coupled with 2-amino-8-hydroxynaphthalene sulfonic acids, then reduced in the usual manner and finally reacted with isocyanates to form asymmetric ureas or with phosgene to form symmetric ureas. For information on the individual reactions, reference may be made, for example, to Houben-Weyl, Methoden der Organischen Chemie, Volum X/3, Fourth Edition 1965.

The preparation of dyes 1,2,7 and 8 is described in detail below.

EXAMPLE 1

(DYE 1)

31.1 Parts by weight of 2-aminonaphthalene-4,8-disulfonic acid are diazotized in the usual manner and then combined with a solution of 22.4 parts by weight of 1-amino-3-($\alpha$-carboxymethoxy-acetamino)-benzene in a mixture of 14 parts by volume of concentrated hydrochloric acid and 300 parts by volume of water. 100 Parts by volume of a 20% aqueous sodium acetate solution are then added dropwise. A yellow dye is produced. After termination of the coupling reaction, the amino monoazo dye is heated to 70°C, precipitated with 140 parts by weight of rock salt and suction filtered. The dye is then dissolved in 600 parts by volume of water. Phosgene is then introduced at pH 8.5 to 9.0 for 3 hours. The reaction solution is heated to 70°C and approximately 100 parts by weight of rock salt are added. The dye precipitates and is isolated. When dry it is a yellow powder.

EXAMPLE 2

(DYE 2)

2-Aminonaphthalene-4,8-disulfonic acid is coupled with 1-amino-3-diglycolyl-aminobenzene as in Example 1. The resulting dye is dissolved in 600 parts by volume of water at pH 7.0–7.5. A solution of 10 parts by weight of methyl isocyanate in 90 parts by volume of toluene is then added dropwise at 30° to 40°C. After termination of the reaction, the dye is isolated with 120 parts by weight of rock salt at 70°C. It is a yellow powder when dry.

EXAMPLE 3

(DYE 7)

23.8 Parts by weight of 5-nitro-2-aminobenzenesulfonic acid-1 are stirred up in 500 parts by volume of water. 15 Parts by volume of concentrated hydrochloric acid are then added. Diazotizaton is then carried out with 16 parts by volume of 30% sodium nitrite solution at 0 to 5°C. After termination of diazotization, the excess of nitrous acid is destroyed and a solution of 23.9 parts by weight of 2-amino-8-hydroxynaphthalene sulfonic acid-6 in 500 parts by volume of water is run in. A dye is formed at pH 4.5 to 6. After termination of the coupling reaction, the reaction mixture is adjusted to pH 10.0 and reduced with sodium sulfonic in known manner. The dye is then precipitated with 240 parts by weight of rock salt and then dissolved neutral in 500 parts by volume of water, whereupon a solution of 7.1 parts by weight of ethyl isocyanate in 100 parts by volume of toluene is added dropwise with stirring. A magneta dye precipitates. It is suction filtered and dried.

EXAMPLE 4

(DYE 8)

23.8 Parts by weight of 5-nitro-2-aminobenzenesulfonic acid-1 are stirred up in 500 parts by volume of water. 15 Parts by volume of concentrated hydrochloric acid are then added and the reaction mixture is then diazotized with 15 parts by volume of a 30% sodium nitrite solution at 0° to 5°C. After termination of diazotization, the excess of nitrous acid is destroyed and a solution of 25.3 parts by weight of 2-methylamino-8-hydroxynaphthalenesulfonic acid-6 in 500 parts by volume of water is run in. A dye is obtained at pH 4.5–6.

After termination of the coupling reaction, the reaction mixture is adjusted to pH 10 and reduced with sodium sulfide in the usual manner. The red dye is then precipitated from the dye solution with 240 parts by weight of rock salt and then dissolved neutral in 500 parts by volume of water, after which a solution of 7.1 parts by weight of ethylisocyanate in 100 parts by volume of toluene is added dropwise with stirring. A magneta dye precipitates after the addition of rock salt. It is suction filtered and dried.

The new yellow and magenta dyes as well as the known cyan dyes can be used according to the invention for preparing yellow, magenta and cyan inks which are particularly suitable for use in the ink jet process. The dyes and the inks produced therefrom satisfy the conditions of the ink jet process indicated above particularly as regards solubility, light fastness and adherence to the support. The main solvent used for the inks according to the invention is water. The use of low boiling organic additives is avoided as far as possible in order to eliminate the risk of any change in the properties on prolonged standing due to partial evaporation. It has been found advisable, however, also to prevent evaporation of the water and hence drying, by adding so called moisture retaining agents to the aqueous dye solution. These are mainly high boiling organic compounds which are miscible with water and in addition keep the viscosity of the solution as low as possible. The following are examples of such moisture retaining substances: Hydroxyalkylformamides as described in German Pat. Application P 22 58 875.8(A–G 946) or aliphatic polyols and their alkylethers as described in German Pat. Application DT–OS 2,160,464.

The inks according to the invention may also contain a mixture of two or more dyes according to the invention, optionally together with other dyes not belonging to the invention, in order to obtain the desired color tone.

Examples of yellow, magenta and cyan inks according to the invention are given below:

Yellow inks

| | | |
|---|---|---|
| A | 3.6 | g of dye 1 |
| | 111 | ml of water |
| | 8 | ml of polyglycol (average molecular weight 400) |
| B | 3.6 | g of dye 2 |
| | 126 | ml of water |
| | 8 | ml of Γ-hydroxypropylformamide |
| C | 1.8 | g of dye 1 |
| | 1.8 | g of dye 2 |
| | 120 | ml of water |
| | 10 | ml of γ-hydroxypropylformamide |
| D | 3.0 | g of dye 5 |
| | 120 | ml of water |
| | 8 | ml of β-hydroxypropylformamide |
| E | 1.6 | g of dye 1 |
| | 0.4 | g of dye 2 |
| | 1.6 | g of dye 15 (not according to the invention; formula given below) |
| | 115 | ml of water |
| | 10 | ml of triethylene glycol |

Dye 15

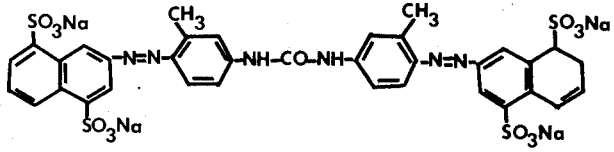

Magenta inks

| | | |
|---|---|---|
| F | 4.5 | g of dye 7 |
| | 161 | ml of water |
| | 10 | ml of polyglycol (average molecular weight 400) |
| G | 4.5 | g of dye 8 |
| | 120 | ml of water |
| | 10 | ml of triethylene glycol |
| H | 3.5 | g of dye 13 |
| | 120 | ml of water |
| | 10 | ml of tetraethylene glycol |
| I | 3.5 | g of dye 7 |
| | 1.0 | g of dye 8 |
| | 131 | ml of water |
| | 10 | ml of β-hydroxyethylformamide |
| K | 3.5 | g of dye 12 |
| | 111 | ml of water |
| | 10 | ml of Γ-hydroxypropylformamide |

Cyan inks

| | | |
|---|---|---|
| L | 2 | g of Sirius light turquoise GL (C.I. 74 180) |

-Continued

```
            50      ml of water
            3       ml of polyglycol (average molecular
                    weight 400)
    M       2       g of Sirius light turquoise GL
            50      ml of water
            4       ml of triethylene glyclol
    N       2       g of Sirius light turquoise GL
            60      ml of water
            5       ml of tetraethylene glycol
    O       2       g of Sirius light turquoise GL
            50      ml of water
            3       ml of β-hydroxyethylformamide
```

We claim:

1. A process for the production of an image on a support, wherein a jet of ink is imagewise modulated by electrical signals and is directed at a support having a component of movement perpendicular to the direction of the ink jet, wherein the improvement comprises containing in the ink an aqueous dye solution including one or more dyes selected from the group consisting of the following:

a. a yellow dye having the following formula:

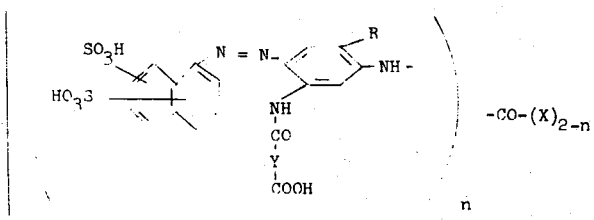

b) a magenta dye having the following formula:

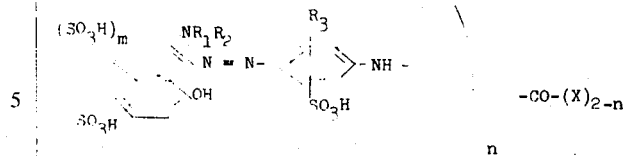

in which formulae

X is an alkyl or alkylamino group

Y is a divalent saturated or unsaturated aliphatic group which may be interrupted by an oxygen atom R is hydrogen or an alkyl or alkoxy group $R_1$ is hydrogen or an alkyl group $R_2$ is hydrogen or an alkyl group $m$ is 0 or 1

$n$ is 1 or 2 and c. a cyan dye which is a copper phthalocyanine containing sulfo groups said included dye or dyes being present in an amount effective in providing in the ink the property of light absorption in the spectral range related to the respective dye.

2. A process as claimed in claim 1 wherein the ink comprises a copper phthalocyanine having on an average 2 to 3 sulfo groups per molecule.

* * * * *